United States Patent
Muthukaruppan et al.

(10) Patent No.: US 10,890,093 B2
(45) Date of Patent: Jan. 12, 2021

(54) EXHAUST GAS TREATMENT SYSTEM FOR A MOTOR VEHICLE

(71) Applicant: FEV Europe GmbH, Aachen (DE)

(72) Inventors: Arun Palaniappan Muthukaruppan, Aachen (DE); Henning Gero Petry, Aachen (DE)

(73) Assignee: FEV Europe GmbH, Aachen (DE)

( * ) Notice: Subject to any disclaimer, the term of this patent is extended or adjusted under 35 U.S.C. 154(b) by 0 days.

(21) Appl. No.: 16/167,890

(22) Filed: Oct. 23, 2018

(65) Prior Publication Data

US 2019/0120113 A1    Apr. 25, 2019

(30) Foreign Application Priority Data

Oct. 23, 2017   (DE) .................. 10 2017 124 757

(51) Int. Cl.
*F01N 3/08* (2006.01)
*F01N 11/00* (2006.01)
(Continued)

(52) U.S. Cl.
CPC ............ *F01N 11/00* (2013.01); *F01N 3/0842* (2013.01); *F01N 3/2066* (2013.01);
(Continued)

(58) Field of Classification Search
CPC .... F01N 11/00; F01N 13/0093; F01N 3/0842; F01N 3/2066; F01N 2900/1602;
(Continued)

(56) References Cited

U.S. PATENT DOCUMENTS

2005/0069476 A1* 3/2005 Blakeman .......... B01D 53/9431
423/239.1
2005/0103000 A1* 5/2005 Nieuwstadt ............. F01N 11/00
60/286

(Continued)

FOREIGN PATENT DOCUMENTS

DE            10032571 A1    3/2002
DE        102014111111 A1    2/2015
DE        102015221945 A1    5/2017

OTHER PUBLICATIONS

German Search Report dated Jun. 27, 2018, German application No. 10 2017 124 757.2.

*Primary Examiner* — Matthew T Largi
(74) *Attorney, Agent, or Firm* — Dinsmore & Shohl LLP

(57) ABSTRACT

Exhaust gas treatment system (100) for a motor vehicle, comprising a first catalytic converter (101-1) for selective catalytic reduction; a second catalytic converter (101-2) for selective catalytic reduction; a first nitrogen oxide sensor (103-1) upstream of the first catalytic converter (101-1) for detecting a first nitrogen oxide value (NOx-1); a second nitrogen oxide sensor (103-2) between the first and the second catalytic converter (101-1; 101-2) for detecting a second nitrogen oxide value (NOx-2); a third nitrogen oxide sensor (103-3) downstream of the second catalytic converter (101-2) for detecting a third nitrogen oxide value (NOx-3); an electronic evaluation device (105) for calculating a first efficiency of the first catalytic converter (101-1) on the basis of the first and the second nitrogen oxide value (NOx-1; NOx-2), a second efficiency of the second catalytic converter (101-2) on the basis of the second and the third nitrogen oxide value (NOx-2; NOx-3) and a total efficiency of the exhaust gas treatment system (100) on the basis of the first and the third nitrogen oxide value (NOx-1; NOx-3); and a fault determination unit (113) for ascertaining a cause of a (Continued)

fault on the basis of an assignment matrix (200) which assigns a cause of a fault on the basis of the first efficiency, the second efficiency and the total efficiency.

9 Claims, 3 Drawing Sheets

(51) Int. Cl.
    *F01N 3/20*     (2006.01)
    *F01N 13/00*     (2010.01)

(52) U.S. Cl.
    CPC ...... *F01N 13/0093* (2014.06); *F01N 2550/02* (2013.01); *F01N 2560/026* (2013.01); *F01N 2560/14* (2013.01); *F01N 2610/02* (2013.01); *F01N 2900/1402* (2013.01); *F01N 2900/1602* (2013.01); *Y02T 10/12* (2013.01); *Y02T 10/40* (2013.01)

(58) Field of Classification Search
    CPC ......... F01N 2560/14; F01N 2900/1402; F01N 2610/02; F01N 2560/026; F01N 2550/02; F01N 11/002
    See application file for complete search history.

(56) References Cited

U.S. PATENT DOCUMENTS

| | | | |
|---|---|---|---|
| 2010/0205940 A1* | 8/2010 | Toshioka | F01N 13/0097 60/276 |
| 2010/0218487 A1* | 9/2010 | Wang | F02D 41/146 60/287 |
| 2010/0229531 A1* | 9/2010 | Chi | B01D 53/90 60/274 |
| 2015/0040543 A1* | 2/2015 | Shetney | B01D 53/9495 60/301 |
| 2015/0096287 A1* | 4/2015 | Qi | F01N 3/208 60/286 |
| 2017/0130637 A1* | 5/2017 | Franz | F01N 3/208 |
| 2019/0040778 A1* | 2/2019 | Nilsson | F01N 3/023 |

* cited by examiner

Fig. 2

| Efficiency of the first catalytic converter 101-1 | | Efficiency of the second catalytic converter 101-2 | | Total efficiency of the exhaust gas cleaning system 100 | | | | Cause of fault |
|---|---|---|---|---|---|---|---|---|
| Temperature: high | Temperature: low | Temperature: high | Temperature: low | Temperature: 101-1: high 101-2: high | Temperature: 101-1: high 101-2: low | Temperature: 101-1: low 101-2: high | Temperature: 101-1: low 101-2: low | |
| High | High | High | High | High | High | High | High | OK |
| Low | High | High | Low | High | High | Low | Low | Catalytic converter 101-1 defective |
| High | Low | Low | Low | High | Low | High | Low | Catalytic converter 101-2 defective |
| Low | Low | Low | Low | Low | Low | Low | Low | Catalytic converters 101-1 and 101-2 defective / Urea quality 0% / All three nitrogen oxide sensors defective / NOx 2 and 3 too low / Both NH3 models faulty |
| Low | Low | High | High/Low | High | High | High | Low | NOx-2 too low / NOx sensor 103-2 defective |
| Low | Low | Low | Low | High | High | Low | Low | NOx-2 too high / NOx sensor 103-2 defective |
| High | Low | Low | Low | Low | Low | Low | Low | NOx-3 too high / NOx-Sensor 103-3 defective |
| High | Low | High | High | High | High | High | High | NOx-3 too low / NOx sensor 103-3 defective |
| High | High | High | Low | High | High | High | High | NOx-1 too low / NOx sensor 103-1 defective |
| Low | Low | High | Low | Low | Low | Low | Low | NOx-1 too high / NOx sensor 103-1 defective |
| Negative | Negative | High | Low | Equal | Equal | Equal | Equal | Catalytic converter 101-1 defective |
| High | Low | Negative | Negative | Equal | Equal | Equal | Equal | Catalytic converter 101-2 defective |
| Negative | Negative | Negative | Negative | Negative | Negative | Negative | Negative | Catalytic converters 101-1 and 101-2 defective |

EXHAUST GAS TREATMENT SYSTEM FOR A MOTOR VEHICLE

CROSS REFERENCE TO RELATED APPLICATIONS

This application claims priority to German application No. DE 102017124757.2 filed on Oct. 23, 2017 all of which are herein incorporated by reference in its entirety.

FIELD OF THE INVENTION

The present invention relates to an exhaust gas treatment system for a motor vehicle and to a method for determining a cause of a fault in an exhaust gas treatment system.

BACKGROUND OF THE INVENTION

In the case of a catalytic converter for selective catalytic reduction (SCR—Selective Catalytic Reduction) it is necessary, by law, to monitor whether the catalytic converter has the required reduction capability for nitrogen oxides. Furthermore, it is necessary to monitor whether nitrogen oxide sensors in the exhaust gas section are functioning correctly. It is technically difficult to distinguish between a faulty catalytic converter, faulty nitrogen oxide sensors and a faulty metering system for reducing agent since the same symptoms, such as a lower level of nitrogen oxide conversion for example, occur in these cases. This requirement is particularly important in the case of a diesel exhaust gas section which comprises two actively metered catalytic converters one behind the other and three nitrogen oxide sensors.

The object of the present invention is to determine a cause of a fault in an exhaust gas treatment system in a technically simple manner and with a high degree of accuracy.

SUMMARY OF THE INVENTION

According to a first aspect, the object is achieved by an exhaust gas treatment system for a motor vehicle, comprising a first catalytic converter for selective catalytic reduction; a second catalytic converter for selective catalytic reduction; a first nitrogen oxide sensor upstream of the first catalytic converter for detecting a first nitrogen oxide value; a second nitrogen oxide sensor between the first and the second catalytic converter for detecting a second nitrogen oxide value; a third nitrogen oxide sensor downstream of the second catalytic converter for detecting a third nitrogen oxide value; and an electronic evaluation device for calculating a first efficiency of the first catalytic converter on the basis of the first and the second nitrogen oxide value, a second efficiency of the second catalytic converter on the basis of the second and the third nitrogen oxide value and a total efficiency of the exhaust gas treatment system on the basis of the first and the third nitrogen oxide value; and a fault determination unit for ascertaining a cause of a fault on the basis of an assignment matrix which assigns a cause of a fault on the basis of the first efficiency, the second efficiency and the total efficiency. This achieves the technical advantage that possible causes of faults or defects in individual components of the exhaust gas treatment system can be quickly ascertained in a simple and reliable manner. Components of the exhaust gas treatment system which have failed can be easily identified. In this case, the components comprise the catalytic converters or a system for injecting an aqueous urea solution into the catalytic converters.

In a technically advantageous embodiment of the exhaust gas treatment system, the electronic evaluation device comprises a data memory for storing the assignment matrix. This achieves the technical advantage, for example, that the assignment matrix can be permanently stored.

In a further technically advantageous embodiment of the exhaust gas treatment system, the electronic evaluation device comprises a data interface for updating the assignment matrix. This results in the technical advantage, for example, that changes and adjustments can also be made at a late stage.

In a further technically advantageous embodiment of the exhaust gas treatment system, the exhaust gas treatment system comprises a first temperature sensor for detecting a first temperature of the first catalytic converter and a second temperature sensor for detecting a second temperature of the second catalytic converter. This achieves the technical advantage, for example, of further data for ascertaining the cause of a fault being ascertained.

In a further technically advantageous embodiment of the exhaust gas treatment system, the electronic evaluation device is designed to additionally determine the cause of a fault on the basis of the first and the second temperature. This achieves the technical advantage, for example, that individual defective components of the exhaust gas treatment system can be identified more accurately.

In a further technically advantageous embodiment of the exhaust gas treatment system, the assignment matrix is used in order to determine the cause of a fault on the basis of the first and the second temperature. This likewise achieves the technical advantage, for example, that the cause of a fault can be quickly ascertained in few steps.

In a further technically advantageous embodiment of the exhaust gas treatment system, the electronic evaluation device is formed by a digital electronic circuit or by a software module. This achieves the technical advantage, for example, that the initial information can be quickly processed.

According to a second aspect, the object is achieved by a method for determining a cause of a fault in an exhaust gas treatment system, comprising the steps of detecting a first nitrogen oxide value upstream of a first catalytic converter for selective catalytic reduction; detecting a second nitrogen oxide value between the first catalytic converter and a second catalytic converter for selective catalytic reduction; detecting a third nitrogen oxide value downstream of the second catalytic converter for selective catalytic reduction; calculating a first efficiency of the first catalytic converter on the basis of the first and the second nitrogen oxide value, a second efficiency of the second catalytic converter on the basis of the second and the third nitrogen oxide value and a total efficiency of the exhaust gas treatment system on the basis of the first and the third nitrogen oxide value; and ascertaining a cause of a fault on the basis of an assignment matrix which assigns a cause of a fault on the basis of the first efficiency, the second efficiency and the total efficiency. This achieves the same technical advantages as the exhaust gas treatment system according to the first aspect.

In a technically advantageous embodiment of the method, the cause of a fault is additionally determined on the basis of a temperature of the first catalytic converter and/or the second catalytic converter. This likewise achieves the technical advantage, for example, of further data for ascertaining the cause of a fault being ascertained.

In a further technically advantageous embodiment of the method, the assignment matrix is used in order to determine the cause of a fault on the basis of the first and the second temperature. This likewise achieves the technical advantage, for example, that the cause of a fault can be quickly ascertained in few steps.

In a further technically advantageous embodiment of the method, the assignment matrix is updated via a data interface. This has the technical advantage, for example, that changes and adjustments can also be made at a late stage.

Exemplary embodiments of the invention are illustrated in the drawings and will be described in more detail below.

BRIEF DESCRIPTION OF THE DRAWINGS

FIG. 2 shows an assignment matrix for ascertaining causes of faults; and

DETAILED DESCRIPTION OF THE PREFERRED EMBODIMENTS

Figure 1:
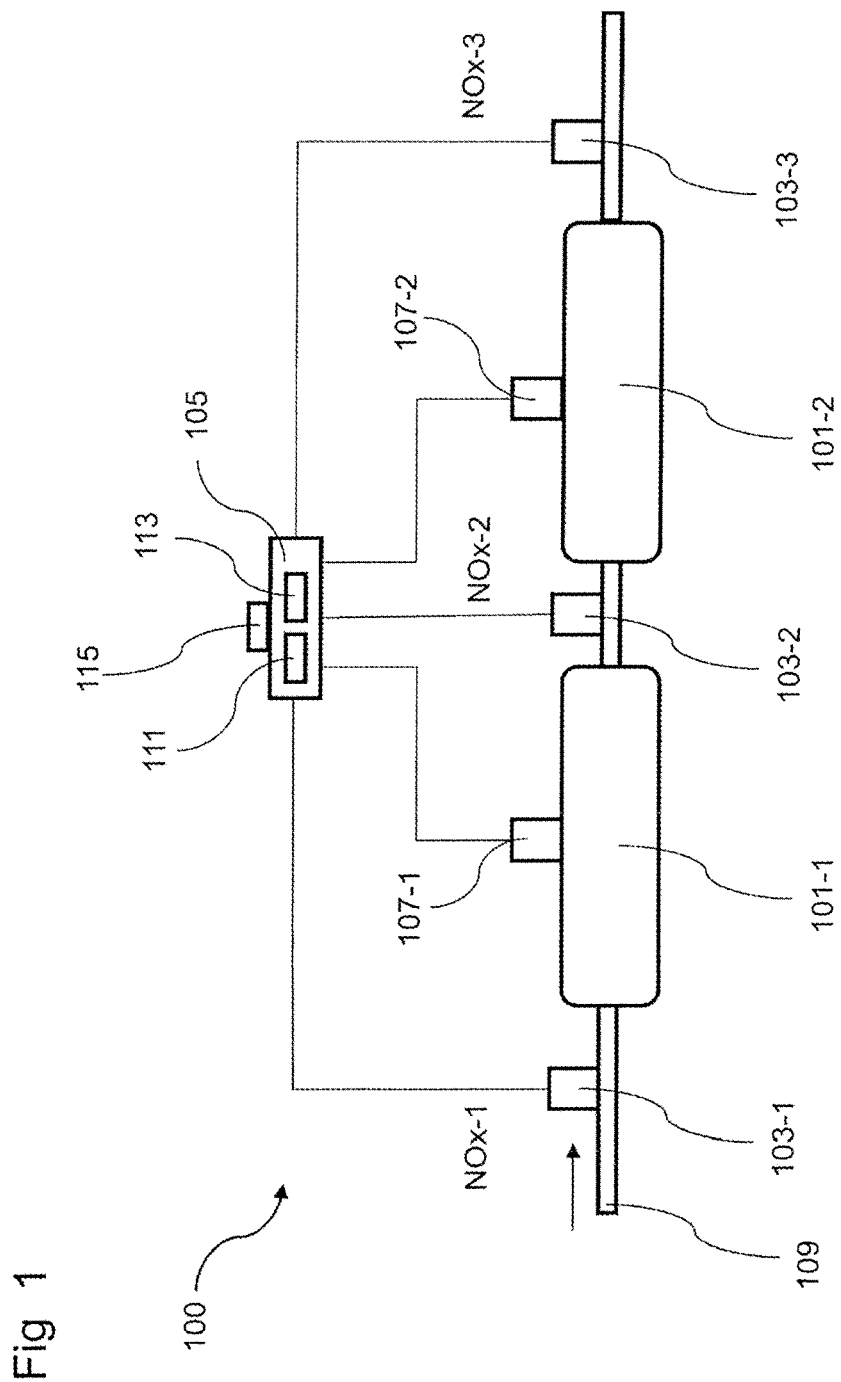
FIG. 1 shows a schematic illustration of an exhaust gas treatment system.

FIG. 1 shows a schematic illustration of an exhaust gas treatment system 100. The exhaust gas treatment system 100 is integrated in the diesel exhaust gas section 109 of a vehicle and serves to clean the exhaust gas. The exhaust gas treatment system 100 comprises a first catalytic converter 101-1 for selective catalytic reduction and a second catalytic converter 101-2 for selective catalytic reduction. The two catalytic converters 101-1 and 101-2 are arranged one behind the other in the diesel exhaust gas section 109, and therefore a double selective catalytic reduction for the exhaust gas can be carried out.

Owing to the selective catalytic reduction, nitrogen oxides NOx in the exhaust gas are reduced. An aqueous urea solution is used for this purpose. The urea solution is injected into the exhaust gas stream in a metered manner by an injector at a system pressure. The ammonia reduces nitrogen monoxide and nitrogen dioxide into nitrogen and water vapor in the titanium-coated SCR catalytic converter starting from an exhaust gas temperature of 170 degrees Celsius.

The chemical reaction at the catalytic converters 101-1 and 101-2 is selective, and therefore the nitrogen oxides (NO, NO2) are preferably reduced while undesired secondary reactions, such as the oxidation of sulfur dioxide to form sulfur trioxide, are largely suppressed.

In order to determine the nitrogen oxide values before and after an exhaust gas treatment, the exhaust gas treatment system 100 comprises a plurality of nitrogen oxide sensors 103-1, . . . , 103-3. The nitrogen oxide sensors 103-1, . . . , 103-3 comprise, for example, ceramic metal oxides which withstand the temperatures in the exhaust gas stream. The nitrogen oxide sensors 103-1, . . . , 103-3 ascertain the nitrogen oxide values in the exhaust gas stream, such as an NO value or an NO2 value for example.

A first nitrogen oxide sensor 103-1 is arranged upstream of the first catalytic converter 101-1 and serves to detect a first nitrogen oxide value NOx-1 in the exhaust gas stream before an exhaust gas treatment. A second nitrogen oxide sensor 103-2 is arranged between the first and the second catalytic converter 101-1 and 101-2 and serves to detect a second nitrogen oxide value NOx-2 in the exhaust gas stream between the catalytic converters 101-1 and 101-2. A third nitrogen oxide sensor 103-3 is arranged downstream of the second catalytic converter 101-2 and serves to detect a third nitrogen oxide value NOx-3 in the exhaust gas stream after the treatment by the exhaust gas treatment system 100.

The nitrogen oxide sensors 103-1, . . . , 103-3 are electrically connected to an electronic evaluation device 105 via a data line, and therefore the measured nitrogen oxide values can be transmitted to said evaluation device. The electronic evaluation device 105 evaluates the nitrogen oxide values and serves to determine a possible cause of a fault. To this end, the electronic evaluation device 105 can calculate an efficiency of the first catalytic converter 101-1, an efficiency of the second catalytic converter 101-2 or a total efficiency of the exhaust gas treatment system 100.

The efficiency of the first catalytic converter 101-1 can be ascertained, for example, by way of the first nitrogen oxide value being divided by the second nitrogen oxide value. The efficiency of the second catalytic converter 101-2 can be ascertained, for example, by way of the second nitrogen oxide value being divided by the third nitrogen oxide value The total efficiency of the exhaust gas treatment system 100 can be ascertained, for example, by way of the first nitrogen oxide value being divided by the third nitrogen oxide value. The electronic evaluation device 105 is formed, for example, by a digital electronic circuit or by a software module.

The evaluation device 105 comprises an electronic fault determination unit 113 for ascertaining a cause of a fault on the basis of an assignment matrix 200. The electronic fault determination unit 113 is likewise formed, for example, by a digital electronic circuit or by a software module.

The evaluation device 105 further comprises a data interface 115 via which the stored assignment matrix can be changed or updated. The data interface 115 is, for example, a wireless interface, such as a WLAN or GSM interface for example, or a wired interface, such as a CAN bus for example.

Furthermore, the exhaust gas treatment system 100 comprises a first temperature sensor 107-1 for detecting a first temperature of the first catalytic converter 101-1 and a second temperature sensor 107-2 for detecting a second temperature of the second catalytic converter 101-2. The temperature sensors 107-1 and 107-2 are electronic components which supply an electrical signal as a measure of the temperature. The temperature sensors 107-1 and 107-2 are also electrically connected to the electronic evaluation device 105 via a data line, and therefore the measured temperature values can be transmitted to said evaluation device.

In addition to the nitrogen oxide values, the temperatures of the catalytic converters 101-1 and 101-2 can be evaluated for ascertaining a cause of a fault. To this end, the causes of faults are ascertained with reference to an assignment matrix which assigns a cause of a fault to the respective nitrogen oxide and temperature values.

The assignment matrix is stored, for example, in an electronic data memory within the electronic evaluation device 105, such as a ROM memory or a flash memory for example. The assignment matrix and the nitrogen oxide and temperature values can be processed by a processor for data processing. In this way, it is possible to ascertain the respective causes of the faults within the exhaust gas treatment system 100.

FIG. 2 shows a possible assignment matrix 200 (fingerprinting matrix) for ascertaining causes of faults. The assignment matrix 200 assigns respective causes of faults on the basis of the respective efficiencies of the first catalytic converter 101-1, of the second catalytic converter 101-2 and of the total exhaust gas treatment system 100, and also on the basis of the temperatures of the first catalytic converter 101-1 and of the second catalytic converter 101-2. Therefore, it is possible to ascertain on the basis of the assignment matrix 200 which cause of a fault is present when the efficiency of the first catalytic converter 101-1, of the second catalytic converter 101-2 and of the exhaust gas treatment system, and also the temperature of the first catalytic converter 101-1 and of the second catalytic converter 101-2 are known. Owing to the assignment matrix 200, individual defective components of the exhaust gas treatment system 100 can be quickly ascertained in a simple manner on the basis of the respective efficiencies and temperatures.

If, for example, the efficiency and the temperature of the first catalytic converter 101-1 are high, the efficiency and the temperature of the second catalytic converter 101-2 are high and the total efficiency of the exhaust gas treatment system 100 is high, the exhaust gas treatment system 100 is in the correct state (OK).

If, however, the efficiency of the first catalytic converter 101-1 at a high temperature is low and the efficiency and the temperature of the second catalytic converter 101-2 are high and the total efficiency of the exhaust gas treatment system 100 is high, the catalytic converter 101-1 is defective.

The corresponding causes of faults for all of the operating states of the exhaust gas treatment system 100 can be ascertained with reference to the assignment matrix 200. The causes of faults can be quickly ascertained in a reliable and simple manner by way of using the assignment matrix 200.

Figure 3:
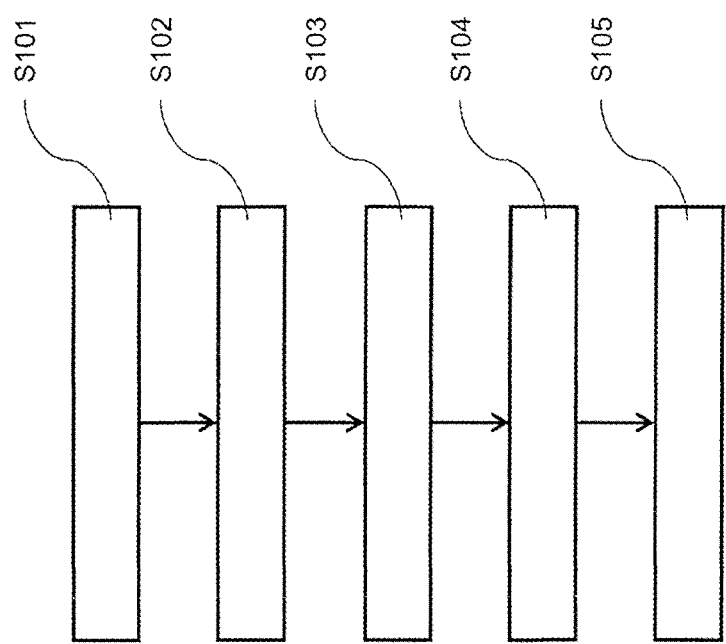
FIG. 3 shows a block diagram of a method for determining a cause of a fault in an exhaust gas treatment system.

FIG. 3 shows a block diagram of a method for determining a cause of a fault in an exhaust gas treatment system 100. The method comprises the step S101 of detecting the first nitrogen oxide value NOx-1 upstream of the first catalytic converter 101-1 for selective catalytic reduction, the step S102 of detecting the second nitrogen oxide value NOx-2 between the first catalytic converter 101-1 and the second catalytic converter 101-2 for selective catalytic reduction and the step S103 of detecting a third nitrogen oxide value NOx-2 downstream of the second catalytic converter 101-2 for selective catalytic reduction. Then, in step S104, the first efficiency of the first catalytic converter is calculated on the basis of the first and the second nitrogen oxide value, the second efficiency of the second catalytic converter is calculated on the basis of the second and the third nitrogen oxide value and the total efficiency of the exhaust gas treatment system is calculated on the basis of the first and the third nitrogen oxide value. In step S105, the cause of a fault is ascertained on the basis of an assignment matrix which assigns a cause of a fault on the basis of the first efficiency, the second efficiency and the total efficiency.

Initial information, which allows a cause of a fault to be established more accurately, is collected by determining the efficiency of the first and the second catalytic converter 101-1 and 101-2 under different conditions, such as the temperature of the catalytic converters for example.

Particularly preferred conditions are those in which:

both the first and also the second catalytic converter 101-1 and 101-2 are at the operating temperature, both the first and also the second catalytic converter 101-1 and 101-2 are below the operating temperature, only the first catalytic converter 101-1 is at the operating temperature, or only the second catalytic converter 101-2 is at the operating temperature.

Using initial information collected in this way, the source of a fault can be determined with the aid of the assignment matrix 200.

An assignment matrix is used in order to determine the source of a fault with reference to the efficiency of the first catalytic converter 101-1, the efficiency of the second catalytic converter 101-2 and a total efficiency of the exhaust gas treatment system 100. Furthermore, the operating temperature of the first catalytic converter 101-1 and the operating temperature of the second catalytic converter 101-2 are determined. The NOx conversion of the individual catalytic converters and the entire exhaust gas treatment system is monitored in order to collect initial information for the assignment matrix.

All of the features explained and shown in association with individual embodiments of the invention can be provided in different combinations in the subject matter according to the invention in order to simultaneously realize the advantageous effects thereof.

All of the method steps can be implemented by devices which are suitable for executing the respective method step. All of the functions which are implemented by substantive features can be a method step of a method.

The scope of protection of the present invention is given by the claims and is not restricted by the features explained in the description or shown in the figures.

What is claimed is:

1. An exhaust gas treatment system for a motor vehicle, comprising a first catalytic converter for selective catalytic reduction;

a second catalytic converter for selective catalytic reduction;

a first nitrogen oxide sensor upstream of the first catalytic converter detecting a first nitrogen oxide value (NOx-1);

a second nitrogen oxide sensor between the first and the second catalytic converter detecting a second nitrogen oxide value (NOx-2);

a third nitrogen oxide sensor downstream of the second catalytic converter detecting a third nitrogen oxide value (NOx-3);

an electronic evaluation device including electronic data memory and a processor calculating a first efficiency of the first catalytic converter on the basis of the first and the second nitrogen oxide value (NOx-1; NOx-2), a second efficiency of the second catalytic converter on the basis of the second and the third nitrogen oxide value (NOx-2; NOx-3) and a total efficiency of the exhaust gas treatment system on the basis of the first and the third nitrogen oxide value (NOx-1; NOx-3); and a fault determination unit ascertaining a cause of a fault in any one of the first, second or third nitrogen oxide sensor, or any one of the first and/or second catalytic converter, or all of the first, second or third nitrogen oxide sensor and the first and/or second catalytic converter on the basis of an assignment matrix which assigns the cause of the fault on the basis of the first efficiency, the second efficiency and the total efficiency.

2. The exhaust gas treatment system as claimed in claim 1, wherein the electronic data memory stores the assignment matrix.

3. The exhaust gas treatment system as claimed in claim 1, wherein the exhaust gas treatment system comprises a first temperature sensor detecting a first temperature of the first catalytic converter and a second temperature sensor detecting a second temperature of the second catalytic converter.

4. The exhaust gas treatment system as claimed in claim 3, wherein the electronic evaluation device determines the cause of a fault on the basis of the first and the second temperature.

5. The exhaust gas treatment system as claimed in claim 4, wherein the assignment matrix is used in order to determine the cause of the fault on the basis of the first and the second temperature.

6. A method for determining a cause of a fault in an exhaust gas treatment system, comprising the steps of:
   detecting a first nitrogen oxide value (NOx-1) upstream of a first catalytic converter for selective catalytic reduction;
   detecting a second nitrogen oxide value (NOx-2) between the first catalytic converter and a second catalytic converter for selective catalytic reduction;
   detecting a third nitrogen oxide value (NOx-2) downstream of the second catalytic converter for selective catalytic reduction;
   calculating a first efficiency of the first catalytic converter on the basis of the first and the second nitrogen oxide value (NOx-1; NOx-2), a second efficiency of the second catalytic converter on the basis of the second and the third nitrogen oxide value (NOx-2; NOx-3) and a total efficiency of the exhaust gas treatment system on the basis of the first and the third nitrogen oxide value (NOx-1; NOx-3); and
   ascertaining a cause of a fault in any one of the first, second or third nitrogen oxide sensor or any one of the first and/or second catalytic converter or all of the first, second or third nitrogen oxide sensor and the first and/or second catalytic converter on the basis of an assignment matrix which assigns the cause of the fault on the basis of the first efficiency, the second efficiency and the total efficiency.

7. The method as claimed in claim 6, wherein the cause of the fault is additionally determined on the basis of a temperature of the first catalytic converter and/or the second catalytic converter.

8. The method as claimed in claim 7, wherein the assignment matrix is used in order to determine the cause of the fault on the basis of the first and the second temperature.

9. The method as claimed in claim 6, wherein the assignment matrix is updated via a data interface.

* * * * *